United States Patent
Yamamoto et al.

(10) Patent No.: US 6,770,312 B1
(45) Date of Patent: Aug. 3, 2004

(54) FROZEN FOODS AND PROCESS FOR PRODUCING THE SAME

(75) Inventors: Tatsuya Yamamoto, Tokyo (JP); Katsumi Matsuzaki, Tokyo (JP); Kensuke Furuyama, Tokyo (JP); Toshifumi Andou, Tokyo (JP); Kazuo Takemura, Tokyo (JP); Akira Tamegai, Tokyo (JP)

(73) Assignee: Ajinomoto Co., Inc., Tokyo (JP)

( * ) Notice: Subject to any disclaimer, the term of this patent is extended or adjusted under 35 U.S.C. 154(b) by 123 days.

(21) Appl. No.: 09/806,157

(22) PCT Filed: Jul. 28, 2000

(86) PCT No.: PCT/JP00/05054

§ 371 (c)(1),
(2), (4) Date: Mar. 28, 2001

(87) PCT Pub. No.: WO01/08508

PCT Pub. Date: Feb. 8, 2001

(30) Foreign Application Priority Data

Jul. 30, 1999 (JP) .......................................... 11-217126

(51) Int. Cl.⁷ ................................................ A23B 4/10
(52) U.S. Cl. .......................... 426/302; 426/93; 426/100; 426/303; 426/557; 426/618
(58) Field of Search ................................. 426/557, 302, 426/303, 100, 618, 93

(56) References Cited

U.S. PATENT DOCUMENTS 5,114,727 A * 5/1992 Brimelow et al. .......... 426/557
5,139,808 A * 8/1992 Barnes et al. ................ 426/557
5,436,015 A * 7/1995 Patterson et al. ........... 426/557
5,789,008 A * 8/1998 Monte .......................... 426/293
6,063,423 A * 5/2000 Virtanen ...................... 426/303
6,139,898 A * 10/2000 Meyer et al. ................ 426/303
6,235,330 B1 * 5/2001 Scherpf et al. .............. 426/303

FOREIGN PATENT DOCUMENTS

| JP | 2-9353 | 1/1990 |
| JP | 9-75023 | 3/1997 |
| JP | 9-220077 | 8/1997 |

* cited by examiner

*Primary Examiner*—Lien Tran
(74) *Attorney, Agent, or Firm*—Armstrong, Kratz, Quintos, Hanson & Brooks, LLP

(57) ABSTRACT

The frozen food product according to the present invention contains as a major ingredient boiled rice grains or boiled pasta pieces; a water migration-preventing layer formed on the surface of each rice grain or boiled pasta; and a sauce layer formed on the surface of the water migration-preventing layer, and the product is frozen in such a state. In the frozen food product described above, rice grains or pasta pieces contained as the major ingredient are mixed homogeneously with a sauce, and if the frozen food is packaged portionwise, the resulting packaged products can give stable quality where the major ingredient and the sauce are blended at a constant rate. This frozen food product can be manufactured by carrying out a step of admixing a primary sauce to the major ingredient so as to form a water migration-preventing layer; a step of freezing the thus treated major ingredient; a step of admixing a secondary sauce to the resulting major ingredient; and a step of freezing the resulting major ingredient.

4 Claims, 2 Drawing Sheets

F I G. 1
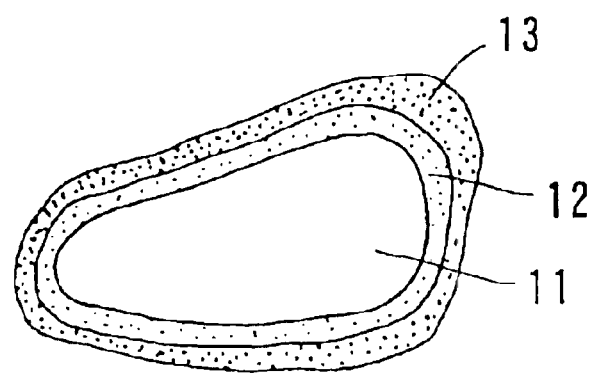
F I G. 2
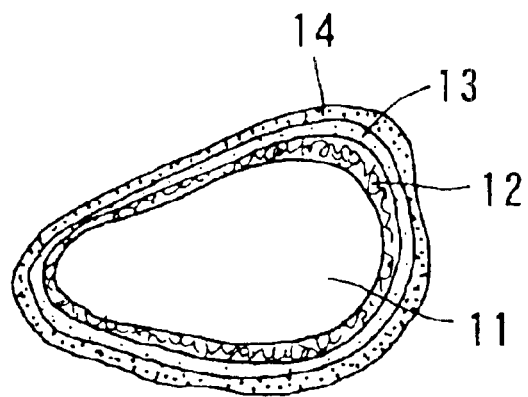

FROZEN FOODS AND PROCESS FOR PRODUCING THE SAME

TECHNICAL FIELD

The present invention relates to a frozen food and a process for manufacturing the same, particularly to a frozen food product obtained by mixing a major ingredient such as rice in pilaf or risotto, or pasta in pasta salad or macaroni au gratin with auxiliary ingredients including sauces and other ingredients (including chopped vegetables and the like) to be cooked with the major Ingredient and freezing the resulting mixture, as well as, a process for manufacturing the same.

BACKGROUND ART

In a general and conventional process for manufacturing a frozen rice, when rice is mixed with a sauce, the sauce is admixed beforehand together with other ingredients to the rice, and the resulting mixture is boiled, or after a rice is boiled, a sauce and other ingredients are admixed thereto. The resulting sauced rice is subjected to individual quick freezing using various types of freezing machines, so that grains of boiled rice are not integrated into blocks. There are known techniques for achieving individual quick freezing of rice, which include, for example, the drum tumbling method using a refrigerant such as liquefied nitrogen and dry ice and a fluid agitation method utilizing cold air generated by a freezing machine.

Meanwhile, in the field of frozen rice, there have been expected demands for foods having high water contents, for example, a wet type frozen rice having a water content of 65% or more, which forms a rice porridge containing additional ingredients or a risotto when unfrozen. However, in the conventional freezing techniques, a sauce having a high water content is admixed to rice prior to the freezing step, so that the water contained in the sauce migrates into the rice to impair texture of the rice and that the rice grains deposit to the interior of the freezing machine or the mixer, due to the adhesiveness of the sauce itself and to the effects of mixing and kneading in the temperature region before the freezing step. The deposit can grow gradually into massive clusters, which apply overload to the freezing machine and the like and prevent them from operating smoothly. This sometimes makes it impossible to carry out continuous production. Meanwhile, in order to obtain an individually frozen rice by admixing a sauce to a boiled rice and freezing the resulting mixture, the ratio of the sauce to be added should be less than 10 wt % in order to achieve individual quick freezing. As described above, the freezing step in the prior art has been a great hindrance in obtaining a wet type frozen rice in a desirable state.

Accordingly, wet type frozen rice products commercially available currently are not manufactured by means of individual quick freezing but are predominantly those manufactured by means of block freezing (block-frozen products). However, the block-frozen products involve a problem that they take much time for unfreezing, inconveniently.

Meanwhile, there are products of the type which are distributed in packages each containing a pack of rice and a packet of sauce, and consumers unfreeze them and mix them (frozen products with sauce packets). However, this type of products are not preferred, because they put much trouble to consumers, and manufacturers must prepare the same number of sauce packets as that of the products, imposing them a great burden for inventory control.

Further, there is another type of product obtained by preparing small blocks of frozen sauce (ca. 10 mm cubes) separately from a rice freezing step and admixing them to the individually frozen rice (frozen products with frozen sauce cubes admixed). However, a sauce having a high viscosity does not commingle with the rice homogeneously at the time of unfreezing to mar the taste of the product, so that not only the commercial value of the product is lowered but also production process requires extra steps, causing rise in the cost, disadvantageously. In addition, in the case where a necessary amount of product is taken out from a package and is cooked, the rice and the sauce cannot necessarily be taken out at a constant ratio, and variation is likely to occur in the amount of sauce in the cooked food.

The same applies to a pasta dish cooked by mixing a boiled and drained pasta such as elbow and penne with a tomato sauce or a cream sauce.

As described above, the conventional sauced frozen rice, wet type frozen rice and sauced frozen pasta are inconvenient in view of distribution and consumption, and there is no product of commercial value fitting consumers' needs at present.

DISCLOSURE OF THE INVENTION

It is an object of the present invention to establish a process for manufacturing efficiently products by means of individual quick freezing, in which a major ingredient such as rice grains and pasta pieces are mixed homogeneously with a sauce. More specifically, the objective of the present invention is to provide an unconventional frozen food product of high added value, which enables consumers to unfreeze by such a simple and easy way as has been used for the conventional products prepared by individual quick freezing, and which gives a stable quality (the ratio of rice or pasta to sauce is constant) even when it is packaged portionwise to facilitate portion control and also to provide a process for manufacturing the same.

The frozen food product according to the present invention contains as a major ingredient boiled rice grains or boiled pasta pieces, a water migration-preventing layer formed on the surface of each rice grain or pasta piece, and a sauce layer formed on the surface of the water migration-preventing layer, and the product is frozen in such a state.

The thus formed frozen product has excellent texture, since the sauce is hardly molten by temperature rises, and even if the product once unfrozen is frozen again into a block, it can be returned easily to the original individually frozen state. The unfrozen or cooked rice grains or pasta pieces hardly absorb the water contained in the sauce.

The water migration-preventing layer is a sauce layer formed using a primary sauce of a composition different from that of a secondary sauce forming the external sauce layer. Here, the primary sauce preferably has a sugar content (Brix) of 10 to 40°. The secondary sauce preferably has a sugar content (Brix) of 0 to 25°. The water migration-preventing layer may be a starch layer, an oil film layer or a mixture of a starch and an oil.

Meanwhile, in the case of a pasta, pasta pieces may each be covered on the surface with a sauce layer having a small water content.

The process for manufacturing a frozen food product according to the present invention includes a primary sauce mixing step where a primary sauce is admixed to a major ingredient such as a rice boiled after washing and impregnation with water or a boiled and drained pasta; a first freezing step where the thus treated major ingredient is frozen; a secondary sauce mixing step where a secondary sauce having a composition different from that of the primary sauce is admixed to the thus frozen major ingredient; and a second freezing step where the resulting major ingredient is frozen.

In the above method, the primary sauce is admixed in an amount of 5 to 20% by weight based on the weight of the major ingredient. Meanwhile, when the major ingredient is a boiled rice, the secondary sauce is admixed in an amount of 10 to 40% by weight based on the weight of the boiled rice. When the major ingredient is a pasta, the secondary sauce is admixed preferably in an amount of 10 to 50% by weight based on the weight of the pasta. Further, when the major ingredient is a boiled rice, it is obtained by adding an oil or a fat to an impregnated rice, and boiling the resulting mixture. Here, the oil or fat is added suitably in an amount of 1 to 5% by weight based on the weight of the rice before the boiling treatment.

Meanwhile, when the major ingredient is a boiled rice, a starch is added to a washed rice or to water for impregnating it, and then the rice is impregnated with the resulting mixture. Here, the starch is admixed suitably in an amount of 0.1 to 10% by weight based on the weight of the rice before the boiling treatment.

According to the process of the present invention described above, a frozen rice or frozen pasta in which rice grains or pasta pieces are mixed homogeneously with a sauce can be manufactured efficiently by means of individual quick freezing. Meanwhile, consumers can unfreeze it by such a simple and easy way as has been used for the conventional rice or pasta products prepared by individual quick freezing. In addition, the frozen food product gives stable quality (where the ratio of rice or pasta to sauce is constant) even when it is packaged portionwise, to facilitate portion control. Thus, the present invention can give unconventional frozen food products of high added value.

BRIEF DESCRIPTION OF THE DRAWINGS

FIG. 1 is a cross-sectional view of a frozen food product showing a grain of rice or a piece of pasta covered on the surface with a water migration-preventing layer and a sauce layer:

FIG. 2 is a cross-sectional view of a frozen food product showing a grain of rice or a piece of pasta covered on the surface with a water migration-preventing layer and a plurality of sauce layers.

BEST MODE FOR CARRYING OUT THE INVENTION

Figure 3:
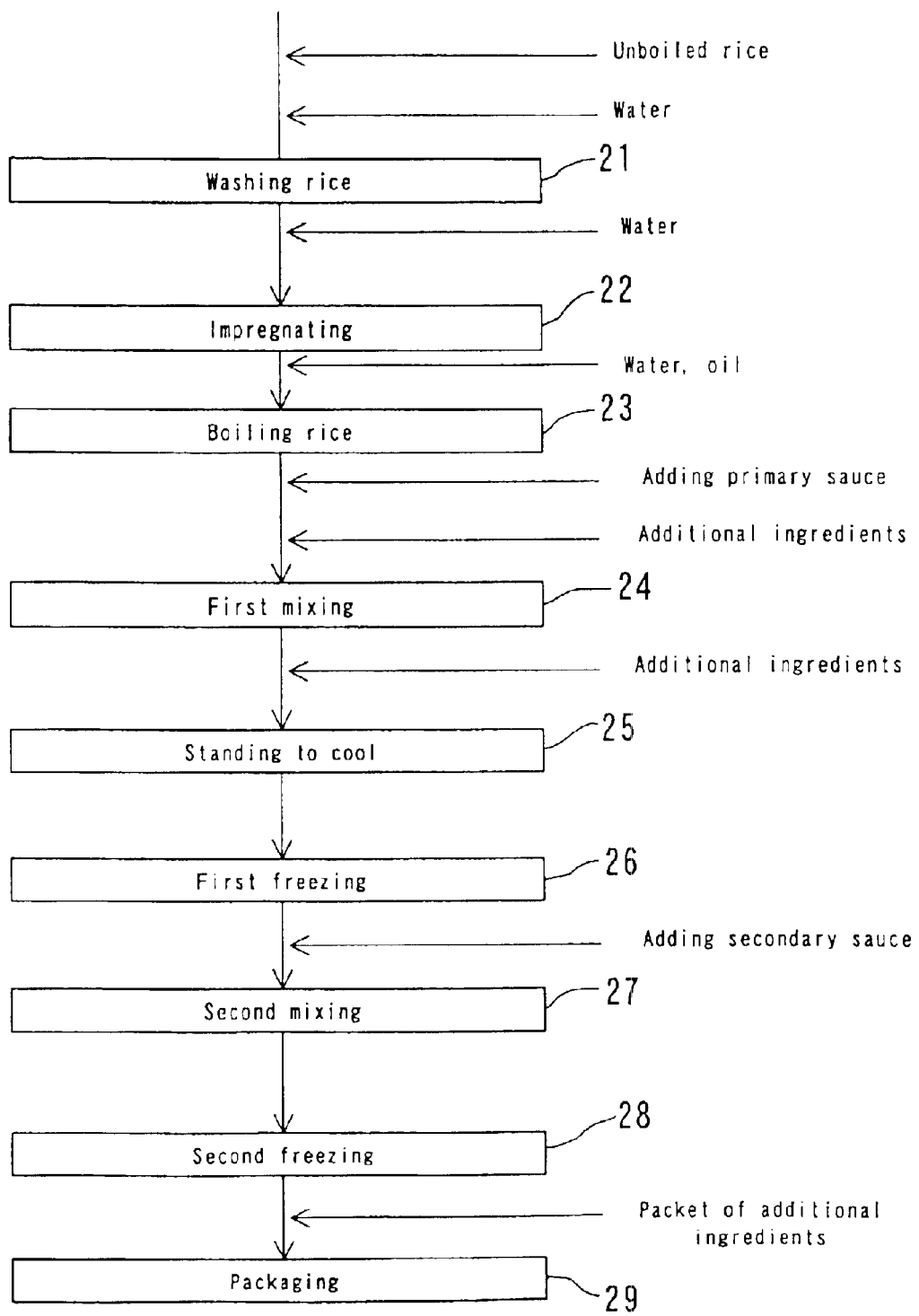
FIG. 3 is a flow chart showing an example of manufacturing process according to the present invention.

In the frozen food product shown in FIG. 1, the surface of each grain of boiled rice (piece of pasta) 11 is covered with a water migration-preventing layer 12 which is further covered on the surface with a sauce layer 13. The water migration-preventing layer 12 prevents the water contained in the external sauce layer 13 from migrating into the rice grain 11. The water migration-preventing layer 12 can be formed by using various kinds of sauces, a starch or an oil, or by using a mixture of at least two kinds of them. Further, as shown in FIG. 2, a plurality of sauce layers 13 and 14 can be formed on the external side of the water migration-preventing layer 12.

Thus, since the surface of each rice grain or pasta piece is covered with the water migration-preventing layer 12 and the layer 12 is further covered on the external surface with the sauce layer 13, the water contained in the sauce forming the sauce layer 13 can be prevented from migrating into the rice grain or pasta piece and deteriorating texture thereof.

It should be noted here that the expression rice referred to in the present invention means any kind of general edible rice, and the expression rice grain means each grain or fragment of rice. The expression pasta refers to any sort of and any shape of those generally called pasta, particularly preferably to short pastas having a maximum length of about 100 mm or less. The expression pasta piece means each piece or fragment of pasta manufactured for human consumption. Here, the rice grain and pasta piece can include aggregations of several rice grains and those of pasta pieces, respectively.

Next, there is described, referring to FIG. 3, an example of manufacturing a frozen rice as shown in FIG. 1, in which the water migration-preventing layer 12 is formed using a primary sauce having a composition different from that of a secondary sauce for forming the external sauce layer 13.

After completion of a rice washing step 21 for washing an unboiled rice with water, the thus treated rice is immersed in water to carry out a rice impregnation step 22 for a predetermined time. Next, a predetermined amount of water is added to the thus impregnated rice having completed the impregnation step 22 to carry out a rice boiling step 23. Here, flavoring materials including oils and fats, bouillon and dried bonito bouillon can be added to the water used in the boiling step.

To the boiled rice obtained in the rice boiling step 23 is admixed a primary sauce (first mixing step 24). In this first mixing step 24, appropriate amounts and suitable kinds of additional ingredients can be added as necessary. This first mixing step 24 can be carried out using a suitable mixing machine. The surface of each rice grain can be covered with the primary sauce by carrying out the first mixing step 24. In a cooling step 25, rice grains are cooled to around ambient temperature. This cooling step 25 can be performed parallel to the first mixing step 24, and the primary sauce and the additional Ingredients can be admixed to the rice between the end of the rice boiling step 23 and the top of the first freezing step 26.

In the first freezing step 26, the sauced rice cooled to an appropriate temperature in the cooling step 25 is charged into an individual quick freezing machine or the like to effect individual freezing. In a second mixing step 27, a secondary sauce is admixed to the sauced rice obtained in the first freezing step 26. In the second mixing step 27, since the rice (or the rice+additional ingredients) has already been subjected to first freezing, the secondary sauce added here is caused to freeze on the surface of each rice grain and the like by the cold temperature thereof, to effect ice coating of the rice.

Finally, a second freezing step 28 is performed, in which the rice mixed with the secondary sauce is frozen to a predetermined refrigeration temperature. This gives a frozen rice as shown in FIG. 1. The thus obtained frozen rice is subjected to a packaging step 29, where the frozen rice is packaged, as necessary, with packets of additional ingredients, and the resulting products are stored or shipped.

The primary sauce and the secondary sauce can be selected suitably depending on the kind of the frozen rice to be manufactured and so forth. While the primary sauce and the secondary sauce influence each other, a primary sauce which is thicker than the secondary sauce is used favorably so as to obtain water migration-preventing facility.

A thicker sauce referred to herein means one having a high sugar content, a low freezing temperature and a low water content, preferably one having a sugar content (Brix) of 10 to 40°, a freezing temperature of −3° C. or lower, a water content of not more than 70 wt %, preferably not more than 60 wt %. A sauce having a sugar content (Brix) of less than 10° sometimes makes It difficult to securely prevent migration of water Into rice grains. A sauce having a sugar content (Brix) of higher than 40° gives too strong taste, particularly strong sweetness, to give insufficient taste and texture and also shows very high viscosity to make handling of the sauce difficult. Meanwhile, a sauce having a freezing temperature of higher than −3° C. cannot sometimes give sufficient water migration-preventing effect owing to the relationship with the water contained in the rice. Further, in the case of a sauce having a water content of more than 70 wt % which exceeds the water content (ca. 60 to 65 wt %) of the rice, it is difficult here again to exhibit sufficient effect of preventing migration of water into the rice.

Such primary sauces include typically tomato sauce, curry sauce, bouillon, sauce demi-glace and meat sauce, and these sauces can be boiled up, as necessary, before admixing. The primary sauce is added to the boiled rice suitably at a mixing ratio of 5 to 20 wt %, particularly suitably in the range of 7 to 15 wt %. If the mixing ratio of the primary sauce is less than 5 wt %, the effect of the sauce added cannot be exhibited sufficiently. On the other hand, if the mixing ratio of the primary sauce is more than 20 wt %, the resulting food tastes too sweet. This can mar the taste of the food, and also increases deposit of the sauce in the production line and freezing machine to be likely to reduce productivity.

In the primary sauce having such properties, the water contained in the sauce does not migrate into the rice, when the sauce and the rice are brought into contact with each other, owing to the relationship of water contents and osmotic pressures between them. Therefore, the water contained in the sauce does not migrate into the rice even when the temperature of the frozen rice is increased or when the frozen rice is unfrozen, or even after cooking, so that it does not occur that the rice is caused to present sticky and watery texture by the large amount of water content.

Meanwhile, a secondary sauce which is thinner than the primary sauce is desirably used. A thinner sauce means one having a low sugar content, a high freezing temperature and a high water content compared with the primary sauce. For example one having a sugar content (Brix) in the range of 0 to 25°, a freezing temperature of −4° C. or higher and a water content of not less than 70 wt % is suitable, and water can also be used as a kind of sauce. In other words, the sugar content is preferably higher in the following order: primary sauce>(primary sauce+secondary sauce)>secondary sauce; whereas the water content is lower in the following order: primary sauce<(primary sauce+secondary sauce) <secondary sauce, preferably.

The secondary sauce is added to the boiled rice suitably in an amount of 10 to 40 wt %, particularly 15 to 35 wt %. An excellent frozen rice having rice grains frozen individually can be obtained by admixing a suitable amount of suitably selected sauce having such properties as the secondary sauce.

As the secondary sauce, tomato sauce, curry sauce, bouillon, sauce demi-glace, etc. can be used, and they may be used, as necessary, after dilution with water to a water content of 70 wt % or more.

The secondary sauce exhibits an action, when it is served as combined with the primary sauce, to neutralize the primary sauce having a little bit harsh taste and texture so that the food can give mild taste and texture as a whole. Therefore, it is essential to select a secondary sauce having optimum qualities depending on the properties of the primary sauce. More specifically, when the food is served, the primary sauce is combined with the secondary sauce, and the rice is dressed with the thus mixed sauce, so that the primary sauce and the secondary sauce each most preferably have such a formulation as can give a predetermined concentration, a predetermined amount, a predetermined taste and a predetermined texture. It is essential to determine suitably the kinds, sugar contents, water contents, etc. of the primary and secondary sauces respectively.

Further, the frozen rice grains are each covered with a secondary sauce to form an external layer having a high water content (the secondary sauce containing a large amount of water having a high specific heat), and thus there is an effect that the secondary sauce hardly melts even if the ambient temperature of the frozen rice elevates briefly. Meanwhile, it can occur that the frozen rice unfrozen partially or totally in a distribution process are stored in a refrozen state. Once the frozen rice is unfrozen, the rice grains are joined with one another through the sauce to form a block, and the block Is refrozen as such. The thus formed block of frozen rice frequently gives poor appearance and poor taste, when it is subjected to unfreezing treatment, compared with the product assuming the individually frozen state. Accordingly, blocking gives rise to a serious problem for frozen rice.

However, the frozen rice grains are each covered with the high-water content secondary sauce as the external layer, so that joining among the rice grains at temperature rises occurs between their secondary sauce layers. Here, the secondary sauce layer contains a large amount of water compared with the primary sauce layer or with a combined layer of the primary sauce and the secondary sauce, the secondary sauce can be cracked readily by external shocks to collapse the block and allow the rice grains to resume the individually frozen state, advantageously. Particularly when a thinner secondary sauce layer is formed, the block to be formed after refreezing can be collapsed more easily.

As described above, by carrying out mixing of rice with the primary sauce and the secondary sauce stepwise and bringing the thicker primary sauce having a low water content into direct contact with the rice, the water in the primary sauce can be prevented from migrating into the rice, even if the temperature rises, owing to the relationship of water contents and osmotic pressures between the rice grains and the primary sauce. Since each rice grain is further covered with a secondary sauce having a higher water content on the external surface, this gives a desired taste. In addition, even if the frozen rice is refrozen at home after purchase and is blocked, the block can be disintegrated to the original individually frozen state, facilitating unfreezing treatment.

Meanwhile, as the water migration-preventing layer 12, an oil film layer or a starch layer can be formed in place of the primary sauce layer. The oil film layer ensures prevention of water migration between the rice grains 11 and the sauce layer 13 at the time of unfreezing. Further, the oil film layer tends to have poor compatibility with the thinner sauce to repel it and to have good compatibility with a thicker sauce. Therefore, as shown in FIG. 2, it is possible to form an oil film layer serving as the water migration-preventing layer 12 on the surface of each rice grain 11, and then to add a thicker primary sauce to form an inner sauce layer 13, followed by addition of a thinner secondary sauce to form an outer sauce layer 14. As described above, by forming successively a sauce layer 13 of a thicker primary sauce and a sauce layer 14 of a thinner secondary sauce on the oil film serving as the water migration-preventing layer 12, migration of water to the rice grains can be prevented more securely. Besides, since the primary sauce and the oil film layer are compatible with each other, admixing of the primary sauce can be carried out more effectively.

Formation of the oil film layer on the surface of each rice grain can be achieved easily. For example, an oil or fat is added to an impregnated rice to form an oil film thereon and then the resulting rice is boiled in the rice boiling step; or an oil or fat is added to water for boiling the rice prior to cooking. Alternatively, an oil or fat can be added to a boiled rice to form an oil film layer.

Oils and fats for forming the oil film layer are not particularly limited so long as they are edible, and, for example, salad oil, rapeseed oil, sesame seed oil, safflower oil, olive oil, animal oils (lard, beef tallow, etc.), fish oils and liver oils can be used.

An oil or fat is added to the unboiled rice suitably in an amount of 5% by weight or less, particularly preferably in the range of 1 to 4% by weight. If the amount of the oil or fat is more than 5% by weight, the resulting product becomes fatty to have marred taste and texture frequently. If the amount of the oil or fat is too small, the oil or fat added cannot exhibit its effect fully.

Meanwhile, when the water migration-preventing layer 12 is a starch layer, the starch undergoes gelatinization or gelation when mixed with water to form a layer which does not permit water permeation. Thus, even if the sauce layer is molten by temporary temperature rises during distribution or storage of the frozen rice or by the heat of cooking to form water, the starch layer can prevent migration of the thus formed water into rice grains.

Any starch can be employed for the starch layer, so long as it is edible. For example, those referred to as starch grains made from potato, wheat, rice, tapioca, corn, etc. can be used. Further, those referred to as starch sugars obtained by subjecting such starch grains to enzyme treatment to have reduced molecular weights can also be used.

The starch is added to an unboiled rice suitably in an amount of 0.1 to 10% by weight, preferably in an amount of 1 to 3% by weight. If the amount of starch is less than 0.1% by weight, it is likely that the starch layer to be formed comes to have a too small thickness to exhibit sufficient water migration-preventing effect. If the amount of starch is more than 10% by weight, the quality of the product frozen rice is lowered.

Formation of starch layer on the surface of each rice grain can be achieved, for example, by adding, prior to the impregnation step, a starch to water for washing or impregnation and then carrying out the impregnation step, or by adding, prior to the rice boiling step, a starch to an impregnated rice or to water for cooking the rice and then carrying out the rice boiling step. Alternatively, a starch can be admixed to a boiled rice to form a starch layer.

Further, the water migration-preventing layer 12 may be formed by building up an oil or fat layer and a starch layer or may be of an oil/fat-and-starch mixed layer containing a mixture of an oil or fat and a starch.

The surface of each rice grain is desirably covered fully with a primary sauce layer, an oil or fat layer, a starch layer or an oil/fat-and-starch mixed layer constituting the water migration-preventing layer; and an external sauce layer successively. However, perfectness is not necessary on the standpoint of practical use, and each of these layers may be partly chipped in each rice grain.

Formation of these layers can be distinguished from the exterior appearance (visually). However, it is sometimes difficult to clearly distinguish the formation visually depending on the kinds of the sauces and of the oil or fat employed. In such cases, formation of the layers can be distinguished by means of magnifying microscope or macrophotography. Meanwhile, when a frozen rice is broken, the layers are separated individually from some rice grains, or the layers in some rice grains are broken into fragments respectively, so that presence of each layer can be confirmed by observing the state of these fragments. Further, if these fragments are heated, the layers can be distinguished by the difference in the melting state depending on the melting point, specific heat, viscosity, etc. Otherwise, presence of each layer can be confirmed by testing taste of the fragments or carrying out analysis based on food chemistry.

Further, if an ice coating layer is formed as the external sauce layer, it prevents migration of water into rice grains and can readily provide a wet-type frozen rice which has a high water content and forms a rice porridge containing additional ingredients or a risotto when unfrozen.

In the case of a pasta, it can be manufactured in the same manner as described above. More specifically, after a step of boiling a dried or undried pasta, the boiled pasta is drained, and each pasta piece is covered with a primary sauce layer, an oil or fat layer, a starch layer or an oil/fat-and-starch mixed layer constituting the water migration-preventing layer; and further with an external sauce layer.

Meanwhile, in the pasta boiling step, an oil or fat or a starch for forming the water migration-preventing layer can be added to the boiling water, and further flavoring materials can also be added thereto. The water content of drained pasta pieces is generally about 50 to 80 wt %, frequently 55 to 70 wt %, depending on the boiling conditions and the like. Therefore, if a sauce (primary sauce) is used for forming the water migration-preventing layer, the primary sauce is designed to have a water content such that it does not exceed much that of the pasta like in the case of rice. By setting the primary sauce to have properties including sugar content and the amount thereof to be admixed like in the case of rice, migration of water into the pasta pieces can be prevented. It should be noted here, in the case of pasta, the secondary sauce is admixed suitably in an amount of 10 to 50% by weight, particularly preferably in an amount of 15 to 25% by weight, per weight of the drained pasta. A desired state of frozen pasta can be obtained by means of individual quick freezing by selecting a sauce having properties suitable as the secondary sauce and by admixing it to the pasta, as described above.

The steps after the first mixing step are repeated in the same manner as in the case of rice. Thus, migration of water into the pasta pieces can be prevented in the resulting frozen pasta, like in the case of rice, to allow it to retain a predetermined texture, and if the pasta pieces are integrated into a block by refreezing, the blocked pasta pieces can be readily returned to the individually frozen state.

Further, in the case of pasta, most pasta products are prepared by admixing oils or fats such as olive oil to pasta pieces. In such food products, since the water content of the sauce layer covering each pasta piece is essentially small, the surface of each pasta piece need not be covered with the water migration-preventing layer but can be covered directly with a sauce layer having a small water content.

EXAMPLE

Example 1

A commercially available tomato ketchup having a sugar content (Brix) of 25° was admixed to a boiled rice obtained by subjecting a rice to washing, impregnation and boiling by the conventional procedures at the ratio as shown in Table 2 (first mixing). Further, 10% by weight of chicken, 5% by weight of potato, 3% by weight of eggplant and suitable amounts of flavoring materials were added as additional ingredients to the boiled rice, and the resulting mixture was blended in a horizontal rotating drum tumbler (e.g., see Japanese Unexamined Patent Publication No. Hei 7-155155). After the thus treated mixture was left to stand for cooling to room temperature, dry ice was sprayed against it to effect first freezing. The freezing temperature was −30° C.

To the first frozen product thus obtained was admixed 20% by weight of 10% aqueous tomato ketchup based on the weight of the first frozen product, and dry ice was sprayed against the resulting mixture to cool it to a temperature of −23° C., providing a sauced frozen rice containing additional ingredients (frozen chicken pilaf). The frozen pilaf was packaged portionwise (250 g/package), and the resulting packages were refrigerated.

During the refrigeration, the storage temperature was elevated to about 0° C. for about 10 minutes once a month over three months, to observe ease of melting and blocking to be caused as the result of melting. About four months after, the blocked rice was disintegrated by crushing it manually, and the thus disintegrated rice grains were observed. Subsequently, one package of frozen pilaf was unfrozen in a microwave oven at 500 W for 5 minutes and was subjected to eating test.

Manufacturing conditions and test results are shown in Table 1. Table 1 shows that the frozen pilaf was not molten readily by the temperature rises during the refrigeration, when the mixing ratio of the primary sauce was 5 to 20% by weight, so that the product did not undergo blocking readily even when it was refrozen, and the rice grains remained in the individually frozen state. Unfrozen pilaf did not become watery nor tasted excessively strong but had excellent taste and texture. Meanwhile, when the mixing ratio of the primary sauce was 3% by weight, the unfrozen pilaf had a watery texture. It is surmised that if the primary sauce layer is thin (the amount of the primary sauce is small), the water contained in the secondary sauce migrates through the primary sauce layer into the rice. When the mixing ratio of the primary sauce was 25% by weight, it was impossible to achieve individual quick freezing, although the unfrozen pilaf had good texture. It is surmised that in freezing of the primary sauce after admixing of the same, the amount of the sauce deposited on each rice grain was to much to achieve individual freezing. It should be noted here that in products having the primary sauce admixed in amounts of 3% by weight and 25% by weight respectively, blocking occurred less frequently than in the conventional frozen rice products, and blocks formed were readily disintegratable.

TABLE 1

| Mixing ratio of first sauce | Ease of melting | State of individual freezing | Texture | Overall evaluation |
|---|---|---|---|---|
| 3 wt % | almost no melting occurred | almost no blocking occurred | watery | poor |
| 5 wt % | almost no melting occurred | almost no blocking occurred | good | good |
| 13 wt % | almost no melting | almost no blocking | very good | very good |

TABLE 1-continued

| Mixing ratio of first sauce | Ease of melting | State of individual freezing | Texture | Overall evaluation |
|---|---|---|---|---|
| 20 wt % | occurred almost no melting occurred | occurred almost no blocking occurred | good | good |
| 25 wt % | almost no melting occurred | blocking observed | tastes too strong, tastes too sweet | poor |

Example 2

The mixing ratio of the primary sauce was changed to 13% by weight based on the weight of boiled rice, and the mixing ratio of the secondary sauce was changed as shown in Table 2. The resulting frozen food products were subjected to storage, unfreezing and eating test under the same conditions as in Example 1.

The results are shown in Table 2. Table 2 shows that the frozen pilaf was not molten readily by the rise in ambient temperature when the mixing ratio of the secondary sauce was 10 to 40% by weight, and the frozen pilaf was disintegrated well into the individually frozen state and had good texture. Meanwhile, when the mixing ratio of the secondary sauce was 7% by weight, the unfrozen pilaf was difficult to disintegrate and had poor texture. Further, when the mixing ratio of the secondary sauce was 44% by weight, the frozen pilaf was not disintegrated sufficiently and had poor texture. It should be noted here that in products having the secondary sauce admixed in amounts of 7% by weight and 44% by weight respectively, blocking occurred less frequently than in the conventional frozen rice products, and blocks formed were readily disintegratable.

TABLE 2

| Mixing ratio of first sauce | Ease of melting | State of Individual freezing | Texture | Overall evaluation |
|---|---|---|---|---|
| 7 wt % | melted easily, blocking occurred easily | blocking occurred easily | tastes too strong, tastes sweet | poor |
| 10 wt % | melted hardly | blocking occurred slightly | Good | good |
| 20 wt % | almost no melting occurred | almost no blocking occurred | very good | very good |
| 30 wt % | almost no melting occurred | almost no blocking occurred | very good | very good |
| 40 wt % | almost no melting occurred | almost no blocking occurred | good | good |
| 44 wt % | almost no melting occurred | blocking observed slightly | watery, bland | poor |

Example 3

A comparison was made between a case where no salad oil was added in boiling a rice and a case where a commercially available salad oil was added in amounts of 2% by weight, 5% by weight and 7% by weight respectively to a rice when it was boiled. Here, 1% by weight of commercially available emulsifier was added to the salad oil. The same primary sauce as in Example 1 (tomato ketchup diluted with water) was admixed to the boiled rice in an amount of 25% by weight. Chicken pilafs were prepared and were subjected to refrigeration, unfreezing and eating test in the same manner as in Example 1.

After the unfreezing treatment, each pilaf was subjected to time-lapse eating test (after 10 min, 20 min, 40 min, 60 min, 120 min, 240 min and 360 min). As a result, the chicken pilaf to which a salad oil was added retained the same sauce enriched texture even after passage of twice as much period as in the case of that to which no salad oil was added. Meanwhile, in the cases where the salad oil was added in amounts of 2% by weight and 5% by weight respectively, the unfrozen pilafs were not fatty but tasted good. However, when it was added in an mount of 7% by weight, the unfrozen pilaf tasted very fatty.

Example 4

Curry pilafs were prepared under the same conditions as in Example 1, except that a commercially available curry sauce having a sugar content (Brix) of 20° was used as the primary sauce and was admixed to a rice at the ratio as shown in Table 3 and that the same curry sauce was diluted with water to 10% and was used as the secondary sauce. The thus obtained curry pilafs were refrigerated and unfrozen under the same conditions as in Example 1.

The results are as shown in Table 3. Table 3 shows that the frozen pilafs were not molten readily by the temperature rise during refrigeration, when the mixing ratio of the primary sauce was 5 to 20% by weight, so that that they hardly undergo blocking even when they were refrozen and can be disintegrated into individually frozen state. The unfrozen pilaf did not become watery nor tasted too strong but had good texture. Meanwhile, when the mixing ratio of the primary sauce was 3% by weight, the unfrozen pilaf had watery texture. Further, when the mixing ratio of the primary sauce was 24% by weight, the frozen pilaf was difficult to disintegrate, although it had good texture.

TABLE 3

| Mixing ratio of first sauce | Ease of melting | State of individual freezing | Texture | Overall evaluation |
| --- | --- | --- | --- | --- |
| 3 wt % | Almost no melting occurred | Almost no blocking occurred | watery | poor |
| 5 wt % | Almost no melting occurred | Almost no blocking occurred | Good | good |
| 13 wt % | Almost no melting occurred | Almost no blocking occurred | very good | very good |
| 20 wt % | Almost no melting occurred | Almost no blocking occurred | Good | good |
| 25 wt % | Almost no melting occurred | Blocking observed Slightly | tastes too strong, tastes too sweet | poor |

Example 5

The same conditions as in Example 4 were used, except that the mixing ratio of the primary sauce was 13% by weight and that the mixing ratio of the secondary sauce was changed. When eating test was carried out after refrigeration and unfreezing, curry pilafs each having good appearance and good texture were obtained when the secondary sauce was admixed in an amount of 10 to 40% by weight.

Example 6

A comparison was made between a case where no lard was added in the rice boiling step and a case where a commercially available lard was added in amounts of 2% by weight, 5% by weight and 8% by weight respectively to a rice when it was boiled. Here, 1% by weight of commercially available emulsifier was added to the lard. The same curry sauce as in Example 4 was admixed as the primary sauce in an amount of 7% by weight based on the weight of the boiled rice. The same diluted curry sauce as in Example 7 was admixed as the secondary sauce in an amount of 25% by weight based on the weight of the boiled rice. Curry pilafs were prepared and were subjected to refrigeration, unfreezing and eating test in the same manner as in Example 4.

After the unfreezing treatment, each curry pilaf was subjected to time-lapse eating test (after 10 min, 20 min, 40 min, 60 min, 120 min, 240 min and 360 min). As a result, the curry pilafs to which lard was added retained the same sauce enriched texture even after passage of 2.5 time as much period as in the case of that to which no lard was added. Meanwhile, in the cases where lard was added in amounts of 2% by weight and 5% by weight respectively, the unfrozen pilafs were not fatty but tasted good. However, when it was added in an mount of 8% by weight, the unfrozen pilaf tasted very fatty.

Example 7

To 13 kg of washed and impregnated rice were admixed 6.5 kg of flavoring materials and 325 g of tapioca starch (having been subjected to enzyme treatment to have an average molecular weight of several thousands), and the resulting mixture was boiled with 18 kg of water. The thus boiled rice had a weight of about 28 kg. To the boiled rice were added 3 kg of sauteed ingredients including chopped onion and chopped carrot and 0.5 kg of tomato ketchup sauce. After the resulting mixture was left to stand for cooling, it was subjected to individual quick freezing using liquefied $CO_2$. The frozen rice had a temperature of $-30°$ C.

A sauce prepared by mixing tomato ketchup to white wine at a weight ratio of 2:1 and maintained at 15° C. was admixed to the thus frozen rice in an amount of 25 parts by weight per 75 parts by weight of the boiled rice, followed immediately by blending using a stirrer. The resulting product had a temperature of $-3°$ C. The product was subjected again to freezing using liquefied $CO_2$ to $-30°$ C. The thus obtained product was packaged portionwise with a low-density polyethylene packaging material having a thickness of 40 $\mu$m (300 g/package).

The packages of frozen rice were put in a showcase for use in shops and were stored there at a temperature of $-15$ to $-20°$ C. During the period of defrosting of the showcase, the temperature elevated to about $-5°$ C. when blocking occurred in some of the frozen rice packages. However, these blocks were readily disintegrated by crushing manually (Sample A).

Supposing that a consumer purchases the packages of frozen rice at a shop and brings them home, the packages of frozen rice were taken out from the showcase and were warmed to about 0° C., and they were stored in a freezing compartment of a domestic refrigerator. Here, the surface of the rice melted in some of the packages, and there were much more packages in which blocking occurred. However, these rice blocks were readily disintegrated by crushing manually (Sample B). Samples A and B which had been disintegrated were dished up, covered with a plastic wrap and cooked in a 500 W microwave oven for 6.5 minutes. As a result, there occurred no migration of water into the rice, no softening of rice grains, nor reduction of sauce content based on visual observation, but these samples had god textures.

Meanwhile, a frozen rice containing a boiled rice and additional ingredients only and refrigerated likewise was caused to undergo notable blocking by the temperature rise, and it had a watery texture when unfrozen. In the case of a rice boiled without adding a tapioca starch, the color of the sauce layer formed on each boiled rice grain faded. It is surmised that the sauce layer was fractured by migration of water. When cooked product was subjected to eating test, it had poor moisture, was too soft and had poor texture.

Example 8

To 13 kg of washed and impregnated rice were admixed 6.5 kg of flavoring materials, 0.325 kg of tapioca starch (having been subjected to enzyme treatment to have an average molecular weight of several thousands) and 1.3 kg of emulsified oil or fat, and the resulting mixture was boiled with 18 kg of water. The thus boiled rice had a weight of about 29 kg. To the boiled rice were added 3.5 kg of additional ingredients including chopped onion and chopped carrot. Further, a sauce having been prepared by mixing tomato ketchup, white wine and powdered malt syrup at a weight ratio of 3:2:1 and maintaining the resulting mixture at 20° C. was added to the above mixture. The sauce was added in an amount of 20 parts by weight per 80 parts by weight of the boiled rice. The resulting product was subjected to individual quick freezing using liquefied $CO_2$ under mixing of the product. The frozen rice had a temperature of –30° C.

Water of about 15° C. was added to the frozen rice. The water was added in an amount of 10 parts by weight per 90 parts by weight of the sauced rice, followed immediately by stirring of the resulting mixture with a stirrer. When the temperature of the product rose to around –2° C., the product was subjected again to freezing using liquefied $CO_2$ to about –20° C. The resulting product was packaged portionwise (300 g/package).

The packages of frozen rice were refrigerated at –15 to –20° C. During the refrigeration, the temperature of the refrigerator was artificially elevated to –5° C., supposing defrosting treatment or transportation. This temperature elevation caused blocking of the frozen rice in some packages. However, the blocks formed were readily disintegrated by crushing manually (Sample C). Even after the blocked rice was refrozen, the block was readily returned to the original individually frozen state by application of a small force (Sample D). The rice was not caused to swell by the temperature rise. This is because, if the surface water layer or sauce layer was molten, the water formed by the melting of the layer was prevented by the starch layer from migrating into the rice. A product whose temperature was elevated during storage was transferred to a 5° C. refrigerator and stored therein for 2 hours, and the thus treated product was stored again in the –20° C. refrigerator (Sample E).

Samples C, D and E were cooked by treating them in a 500 W microwave oven for 7 minutes. When these samples were subjected to eating test, all of them had good textures and moistures.

Example 9

A rice, to which 3% by weight of starch was added, was boiled and frozen temporarily by spraying dry ice snow to allow it to have a temperature of –30° C. To the temporarily frozen product thus obtained was sprayed 20% by weight of Brix 25° tomato ketchup, followed by stirring. The resulting product was blended under spraying of dry ice snow again to give a –30° C. frozen rice. The rice was stored under the same conditions as in Example 1, and was subjected to observation and eating test likewise. As a result, the unfrozen rice did not become watery by virtue of the water absorbing effect of the starch nor tasted too strong. Further, the products which were warmed temporarily to 0° C. during storage formed blocks, and these blocks were hardly disintegratable compared with that in Example 1. However, the blocks were of such a level of bindability as can be collapsed manually relatively easily, and they were disintegrated readily.

Example 10

To a boiled rice cooked according to the conventional procedures were added 10% by weight of olive oil, followed by spraying of dry ice snow to effect temporary freezing to a product temperature of –30° C. To the temporarily frozen product was sprayed 20% by weight of Brix 25° tomato ketchup, followed by stirring of the resulting mixture. To the resulting mixture was sprayed dry ice snow again, and they were blended to give a –30° C. frozen rice. The resulting rice was stored under the same conditions as in Example 1 and was subjected to observation and eating test likewise. As a result, the unfrozen rice did not become watery by virtue of the oil film nor tasted too strong. Further, while the products which were warmed temporarily to 0° C. during storage formed blocks, these blocks were of such a level of bindability as can be disintegrated manually relatively easily, and they were disintegrated readily.

Example 11

In 50 L of hot water, to which 0.5% of sodium chloride and 1% of starch were charged, was put 5 kg of dry pasta (penne), and the pasta was boiled with stirring for 13 minutes until it was softened. The weight of the boiled pasta was twice as much as that of the unboiled pasta. The boiled penne was drained, and after 3 kg of meat sauce (primary sauce) prepared by boiling down a commercially available meat sauce to have a reduced water content of 80% in terms of weight ratio was added to the penne, the resulting mixture was stirred with spatula until the mixture became homogenous based on visual observation. Snow-like dry ice was admixed to the mixture with stirring to effect individual quick freezing of the penne. The pasta before freezing had a temperature of 40° C., and the product temperature dropped to –22° C. after 2 minutes from the initiation of freezing. Here, 13 kg of dry ice was necessary, which is equivalent to the amount of the sauced pasta.

After the temperature of the penne subjected to individual quick freezing was slightly elevated to –20° C., 1.3 kg of gelatin water (secondary sauce) prepared by warming water containing 0.1% of gelatin to 70° C. and then cooling it to 40° C. was admixed to the penne. The product temperature after the mixing became 0.2° C. The ratio of the sauce (secondary sauce+meat sauce) was about 30% of the entire product.

Snow-like dry ice was admixed again to the penne to which gelatin water had been added to effect individual quick freezing. Here, 9 kg of snow-like dry ice was used against 14.3 kg of sauced penne, and they were blended for about 4 minutes to give an individually frozen sauced penne having a product temperature of –43° C.

The thus obtained sauced penne was packaged portionwise in polyethylene pouches (0.5 kg/pouch), and the pouches were stored in a −15° C. refrigerator. When the penne was taken out from the refrigerator, dished and unfrozen in a microwave oven, it formed as such a sauced penne dish, which was extremely excellent both in the taste and in the texture. Meanwhile, when the frozen pasta was cooked by utilizing the unfreezing mode of the microwave oven, it was served as a cold pasta dish. Here again, the cold pasta was very excellent both in the taste and in the texture.

INDUSTRIAL APPLICABILITY

The present invention can be applied widely for manufacturing frozen food products which have good storability and are excellent in the taste and texture when unfrozen, for example, pilaf and risotto using rice as a major ingredient, as well as, pasta salad and macaroni au gratin using pasta as a major ingredient.

What is claimed is:

1. A process for manufacturing a frozen food product comprising:
    a primary sauce mixing step where a primary sauce having a sugar content (Brix) of 10 to 40° is admixed to a rice boiled after washing and impregnation with water or a boiled and drained pasta in an amount of 5 to 20% by weight based on the weight of the rice or pasta;
    a first freezing step where a water migration-preventing layer comprising a component selected from the group consisting of starch and a mixture of starch and oil is formed on the surface of the thus treated rice grain or pasta piece by individual quick freezing of the grain or pasta piece after admixing the primary sauce;
    a secondary sauce mixing step where a secondary sauce having a composition having a sugar content (Brix) of 0 to 25°, and which is lower than that of the primary sauce, is admixed with the thus frozen rice grain or pasta piece filmed with the water migration-preventing layer in an amount of 10 to 40% by weight based on the rice or in an amount of 10 to 50% based on the weight of the pasta; and
    a second freezing step where the resulting rice or pasta is filmed with a sauce layer consisting of the secondary sauce frozen on the surface of the water migration-preventing layer by individual quick freezing of the rice or pasta after admixing the secondary sauce.

2. The process for manufacturing a frozen food product according to claim 1, wherein the rice is boiled after adding an oil or fat in an amount of 1 to 5% by weight based on the weight of the rice before the boiling treatment at the time of impregnation with water.

3. The process for manufacturing a frozen food product according to claim 1, wherein the rice is impregnated with water after adding a starch in an amount of 0.1 to 10% by weight based on the weight of the rice before the boiling treatment.

4. The process of claim 1, wherein in said first freezing step, said component of said water migration-preventing layer is a mixture of starch and oil.

* * * * *